US006669979B1

(12) United States Patent
Zhao et al.

(10) Patent No.: US 6,669,979 B1
(45) Date of Patent: Dec. 30, 2003

(54) METHOD FOR PROMOTING EXTRACTION OF BENEFICIAL COMPOUNDS INTO BEVERAGES NATURALLY CONTAINING SAME, AND FOR EXTENDING THE DURATION OF FRESHNESS OF COFFEE

(76) Inventors: Jifu Zhao, AMC Cancer Research Center 1600 Pierce St., Lakewood, CO (US) 80214; Thomas J. Slaga, AMC Cancer Research Center 1600 Pierce St., Lakewood, CO (US) 80214; Rajesh Agarwal, AMC Cancer Research Center 1600 Pierce St., Lakewood, CO (US) 80214; Brian Slaga, P.O. Box 161391, Austin, TX (US) 78716

( * ) Notice: Subject to any disclaimer, the term of this patent is extended or adjusted under 35 U.S.C. 154(b) by 0 days.

(21) Appl. No.: 09/481,279

(22) Filed: Jan. 11, 2000

(51) Int. Cl.$^7$ ............................... A23F 5/00; A23F 5/10
(52) U.S. Cl. ...................................... 426/595; 426/442
(58) Field of Search ................................ 426/597, 595, 426/598, 435, 433, 442

(56) References Cited

U.S. PATENT DOCUMENTS

| | | | |
|---|---|---|---|
| 312,516 A | * | 2/1885 | Schilling |
| 3,114,641 A | | 12/1963 | Sperti et al. |
| 3,657,424 A | | 4/1972 | Aktins et al. |
| 4,053,652 A | | 10/1977 | Mahlmann |
| 4,325,975 A | | 4/1982 | Lindon et al. |
| 4,497,800 A | | 2/1985 | Larson et al. |
| 4,626,435 A | * | 12/1986 | Zimmerman |
| 4,722,847 A | | 2/1988 | Heckert |
| 4,737,375 A | | 4/1988 | Nakel et al. |
| 4,740,380 A | | 4/1988 | Melachouris et al. |
| 4,851,221 A | | 7/1989 | Pak et al. |
| 4,857,351 A | | 8/1989 | Neilson et al. |
| 4,904,484 A | | 2/1990 | Small et al. |
| 4,919,963 A | | 4/1990 | Heckert |
| 4,985,271 A | * | 1/1991 | Neilson et al. |
| 5,232,709 A | | 8/1993 | Saltman et al. |
| 5,716,649 A | | 2/1998 | Nam |
| 6,045,843 A | | 4/2000 | Gurol |
| 6,086,927 A | | 7/2000 | Frielich et al. |
| 6,102,213 A | * | 8/2000 | Gurol |
| 6,106,874 A | | 8/2000 | Liebrecht et al. |
| 6,312,753 B1 | | 11/2001 | Kealey et al. |

FOREIGN PATENT DOCUMENTS

| | | | |
|---|---|---|---|
| EP | 0 075 114 B1 | | 6/1985 |
| JP | 57-16649 | * | 1/1982 |
| JP | 61-74543 | * | 4/1986 |
| JP | 2-39872 | * | 2/1990 |
| JP | 7-155133 | * | 6/1995 |

OTHER PUBLICATIONS

Duke, James A.; CRC Handbook of Medicinal Herbs; 130–132; CRC Press, Inc.; Boca Raton, FL; USA.

Torzsas et al.; The Influence of High and Low Molecular Weight Chitosan on Colonic Cell Proliferation and Aberrant Crypt Foci Development in CF1 Mice; Food and Chemical Toxicology; 1996; 73–77; v. 34, iss.1; Elsevier Science.

Pittler et al., Randomized, Double–blind Trial of Chitosan for Body Weight Reduction; European Journal of Clinical Nutrition; 1999; 379–381; v. 53; Stockton Press; UK.

Kimura, Y. and Okuda, H.; Prevention by Chitosan of Myelotoxicity, Gastrointestinal Toxicity and Immunocompetent Organic Toxicity Induced by 5–Fluorouracil without Loss of Antitumor Activity in Mice; Jpn. J. Cancer Res., Jul. 1999; 765–774; v. 90; Japan.

Barclay et al.; Glucosamine; The Annals of Pharmacotherapy; May 1998; Abstract vol. 32; Harvey Whitney Books Co.; Cincinnati; USA.

Nepka et al., Chemopreventive Activity of Very Low Dose Dietary Tannic Acid Administration in Hepatoma Bearing C3H Male Mice; Cancer Letters; 1999; 57–62; v. 141; Elsevier Science.

Hartman et al., Tea and Coffee Consumption and Risk of Colon and Rectal Cancer in Middle–Aged Finnish Men; Nutrition and Cancer; 1998; 41–48; v. 31; issue 1; Lawrence Erlbaum Associates, Inc.

Maskaleris et al.; Induction of Cytogenic Damage in Human Lymphocytes In Vitro and of Antineoplastic Effects in Ehrlich Ascites Tumor Cells In Vivo Treated by Methotrexate, Hyperthermia and/or Caffeine; Fundamental and Molecular Mechanisms of Mutagenesis; 1998; 229–236; v. 422; issue 2; Elsevier Science.

Szekely, Tibor; Caffeine as a Stimulant Against Suicide; Arch. Intern Med.; Jan. 27, 1997; 243–244; v. 157.

Tanaka et al.; Inhibition of 4–nitroquinoline–1–oxide–induced Rat Tongue Carcinogenesis by the Naturally Occurring Plant Phenolics Caffeic, Ellagic, Chlorogenic and Ferulic Acids; Carcinogenists; 1993; 1321–1325; v. 14; No. 7.

Huang et al.; Inhibitory Effect of Curcumin, Chlorogenic Acid, Caffeic Acid, and Ferulic Acid on Tumor Promotion in Mouse Skin by 12–0–Tetradecanoylphorbol–13–acetate; Cancer Research; Nov. 1, 1988; 5941–5946; v. 48.

Coffee, Tea, Mate, Methylxanthinas and Methylglyoxal; IARC Monographs on the Evaluation of Carcinogenic Risks to Humans; 1991; 60–89; v. 51.

* cited by examiner

*Primary Examiner*—Anthony J. Weier
(74) *Attorney, Agent, or Firm*—David G. Henry

(57) ABSTRACT

A process for increasing the levels of polyphenolic acid release into coffee which is brewed from beans which are bathed in an aqueous sodium bicarbonate solution shortly after roasting. The same process is applied to other polyphenolics containing beverage substrates, including teas. The bathing of beverage substrates (coffee beans and tea leaves, for example) with the aqueous sodium bicarbonate does not adversely change the taste of the produced beverage, and, in fact, in the case of coffee, such process actually extends the apparent freshness of coffee by inhibiting in the condensation of tannins in the coffee brew, thereby providing, not only the health benefits of the elevated levels of polyphenols, but a means to extend the freshness of the brewed beverage.

1 Claim, No Drawings

METHOD FOR PROMOTING EXTRACTION OF BENEFICIAL COMPOUNDS INTO BEVERAGES NATURALLY CONTAINING SAME, AND FOR EXTENDING THE DURATION OF FRESHNESS OF COFFEE

BACKGROUND OF THE INVENTION

1. Field of The Invention

The present invention relates to nutritional supplements and the manufacture or extraction thereof.

2. Background Information

Recent research indicates that polyphenols in fruits, vegetables, common beverages and plants possess the capacity for diversified, beneficial pharmacological activities. It is widely accepted that these compounds, recently dubbed "vitamin ", possess a wide range of beneficial pharmacological activities which include stabilizing capillary wall tissues, maintaining proper permeability and flexibility of capillaries, and preventing cardiovascular diseases. Numerous studies have also shown that most plant polyphenols possess cancer preventive capacity because of their profound antioxidant activity.

It is, of course, well-known that coffee contains caffeine. However, a lesser-known fact is that coffee contains potentially highly beneficial condensed tannin and polyphenolic acids. Coffee beans contain about 4% caffeine and other nitrogen-containing compounds, two different types of polyphenols, known as condensed tannin and polyphenolic acids. Chlorogenic acid, caffeic acid, 3,4-dicaffeoyl-quinic acid, 4,5-dicaffeoyl-quinic acid, caffeoyl-3-quinic acid and isochlorogenic acid are the main polyphenolic acids present in coffee beans [1].

Caffeic acid and chlorogenic acid have been shown to possess cancer preventive effect (2, 3). Caffeine has also been found to exert anti-inflammatory and anti-carcinogenic effects (4,5). Coffeedrinking people are less prone to commit suicide (6). Recent epidemiological study shows that drinking coffee has a trend to reduce cancer incidence (7). Feeding tannins isolated from coffee to mice in drinking water has been shown to prevent hepatic neoplasm in C3H male mice (8).

It is important to further note that osteoarthritis affects 12% of the American population, with a disproportionate effect on those of advanced years. Glucosamine and glucosamine sulfate are effective in treating and preventing osteoarthrosis (9). Likewise, chitin and chitosan prevent toxicity of S-FU [10], selectively decrease glucose intake and ATP level in tumor cells [11], inhibit tumor cell proliferation in mice [12], and reduce dietary fat absorption to help losing body weight [13].

As is apparent from the above discussion, elevated human consumption of tannin and polyphenolic acids certainly have the potential for providing substantial health benefits to consumers. However, these beneficial compounds in coffee beans remain largely "locked" in discarded coffee grounds under present practices, and are largely unavailable and non-beneficial to coffee drinkers when coffee is brewed by conventional brewing techniques. Therefore, it would be highly beneficial to somehow release substantial portions of coffee's tannin and polyphenolic acids for consumption during coffee drinking, and even more beneficial to do so in a manner which would not be deleterious to the taste of the coffee and, therefore, constitute a deterrent to an otherwise beneficial activity.

References

1. Duke, James A. Handbook of phytochemical constituents of GRAS herbs and other economic plants. Boca Raton, Fla. CRC Press, 1992.
2. Tanaka T, Kojima T, Kawamofi T, Wang A, Suzui M, Okamoto K, Mofi H, Inhibition of 4-nitroquinoline-1-oxide-induced rat tongue carcinogenesis by the naturally occurring plant phenolics caffeic, ellagic, chlorogenic and ferulic acids. Carcinogenesis 1993; 14: 1321–1325.
3. Huang M T, Smart R C, Wong C Q, Conney A H, Inhibitory effect of curcumin, chlorogenic acid, caffeic acid, and femlic acid on tumor promotion in mouse skin by 12-O-tetradecanoylphorbol-t3-acetate. Cancer Res 1988; 48: 5941–5946.
4. Takahashi M, Yanoma S, Yamamoto Y, Rino Y, Amano T, Imada T, Combined effect of CDDP and caffeine against human gastric cell line in vivo. Anticancer Res 1998; 18: 4399–4401.
5. Maskalefis T, Lialiafis T, Tfiantaphyllidis C, Induction of cytogenetic damage in human lymphocytes in vitro and of antineoplastic effects in Ehrlich ascites tumor cells in vivo treated by methotrexate, hyperthermia and/or caffeine. Mutat Res 1998; 422: 229–236.
6. Szekely T, Caffeine as a stimulant against suicide. Arch Intern Med 1997; 157: 243–244.
7. Hartman T J, Tangrea J A, Pietinen P, Malila N, Virtanen M, Taylor P R, Albanes D, Tea and coffee consumption and risk of colon and rectal cancer in middle-aged Finnish men. Nutr Cancer 1998; 31: 41–48.
8. Nepka C, Sivridis E, Antonoglou 0, Kortsaris A, Georgellis A, Taitzoglou I, Hytiroglou P, Papadimitriou C, Zintzaras I, Kouretas D. Chemopreventive activity of very low dose dietary tannic acid administration in hepatoma beating C3H male mice. Cancer Lett 1999; 141: 57–62.
9. Barclay T S, Tsourounis C. McCart G M. Glucosamine Ann Pharmacother. 1998; 32: 574–579.
10. Kimura Y, Okuda H, Prevention by chitosan of myelotoxicity, gastrointestinal toxicity and immunocompetent organic toxicity induced by 5-fluorouracil without loss of antitumor activity in mice. Jpn J Cancer Res 1999; 90: 765–774.
11. Guminska M, Ignacak J, Wojcik E. In vitro inhibitory effect of chitosan and its degradation products on energy metabolism in Ehrlich ascites tumor cells (EAT). PolJPharmacol 1996; 48: 495–501.
12. Torzsas T L, Kendall C W, Sugano M, Iwamoto Y, Rao A V. The influence of high and low molecular weight chitosan on colonic cell proliferation and aberrant crypt foci development in CF1 mice. Food Chem Toxicol 1996; 34: 73–77.
13. Pittler M H, Abbot N C, Harkness E F, Ernst E, Randomized, double-blind trial of chitosan for body weight reduction. Eur J Clin Nutr 1999; 53:379–381.

DETAILED DESCRIPTION OF THE PREFERRED EMBODIMENT

Extensive research by the present inventors produced a finding that chlorogenic acid in particular, and total polyphenols in general can be substantially increased in brewed coffee through a remarkably simple process. The same is true of other brewed beverages the counterpart substrates of which are known to have a significant polyphenolic constituent. Therefore, while the predominant discussion in this specification focuses on coffee, it must be understood that similar results can be obtained through practice of the methods of the present invention in the context of producing beverages from other materials which naturally contain polyphenolic acids (teas, for example).

Both condensed tannin and polyphenolic acids in coffee beans have low water-solubility, and are relatively easier to dissolve in hot water. However, according to experiments by the present inventors, even hot water cannot significantly dissolve coffee polyphenols out of coffee powder. Something more than water at elevated temperatures is required to significantly enhance the extraction of coffee polyphenols out of coffee beans and powder.

The present inventors have discovered that, if applied in the manner prescribed herein, the remarkably simple use of an aqueous solution of sodium bicarbonate in bathing beverage substrate (coffee beans, for example) results in a substantial spike in polyphenols in the end product beverage.

The process of the present invention, when compared with earlier, related processes developed by the present inventors, not only provides a substantial health benefits potential, but permits such benefits to be realized, and the product which carries the benefits to be distributed and sold, with no market or distribution related impediments or inconveniences. This is true, in part, because, unlike the referenced prior processes (the subject of parent applications to this continuation application) the process for spiking polyphenolics pursuant to the present invention, at least in the case of coffee, takes place at the commercial, roasting stage, rather than at the retail sales level.

Remarkably, the addition of the extraction-enhancing base solution (aqueous sodium bicarbonate being solution of choice at present) does not at all change the taste of the ultimately brewed coffee. Quite to the contrary, the effect is to actually extend the coffee's freshness by substantially inhibiting the condensation of tannins in the coffee brew (the principal source of the objectionable taste of "stale" coffee). This latter effect is an independently significant aspect of the present invention, separate apart from the health benefits derived therefrom.

It scarcely requires comment that sodium bicarbonate is a natural, non-toxic material which is in widespread use for human consumption already. Therefore, the processes of the present invention cannot introduce any substances which could possibly be deleterious to consumers.

Illustrative examples of processes of the present invention follow. It should be understood, of course, that commercial processing according to the present invention will take place on much larger scales than the illustrative examples provided. In, with proportional increases in the respective constituents (coffee beans, water, and sodium bicarbonate) for larger batches.

According to the present invention, full caff beans were roasted in commercial roaster for 20 min at 400° F. to achieve a "dark" roast (a level 4 roast in the coffee roasting scale of 1 to 5, with 1 being the lightest roast, and 5 being a very dark roast). As with the addition of flavoring agents (pecan, hazelnut, Irish cream flavorings, for example) in the present case it is desirable to apply the aqueous sodium bicarbonate bath at a time when the beans will readily absorb the added agent—sodium bicarbonate. Therefore, the sodium bicarbonate bath (or "rinse") is applied (as the above referenced flavoring agents are customarily applied) when the beans are still quite hot from the roasting process. While a precise bean temperature is not crucial to the present process, an acceptable bean temperature exists when the beans may be held in the bare hand of the typical individual for approximately five seconds, but not significantly longer without experiencing heat related discomfort. Supplemental agents are added to coffee beans at such a temperature because the beans are more porous under such a condition. It should also be noted that beans which are more darkly roasted are, at any comparable temperature, more porous than more lightly roasted beans.

Trials by the present inventors clearly establish that, compared with the use of mere tap water to brew coffee, using a sodium bicarbonate rinse with freshly roasted coffee beans resulted in increases in polyphenol levels in brewed coffee by substantial degrees.

Separate experiments also established that a polyphenolic fraction isolated from coffee brew significant inhibits chemical tumor promoter-caused oxidative stress and inflammatory responses in mouse skin. This polyphenolic fraction also resulted in up to 80% inhibition of chemical tumor promoter-caused induction of omithine decarboxylase, a marker of tumor promotion, in mouse skin. This polyphenolic fraction from coffee brew was identified to contain chlorogenic acid as a major single compound.

More specifically, in oxidative stress studies, topical application of 12-O-tetradecanoylphorbol-13-acetate (TPA), a skin tumor promoter, to SENCAR mouse dorsal skin, resulted in severe edema and hyperplasia, and a significant depletion in superoxide dismutase (SOD), catalase (CAT) and glutathione peroxidase (GPX) activities. Pre-application of a polyphenolic fraction isolated from coffee (CPF) (6 mg/mouse in each case) 30 min before TPA application significantly antagonized the depletion of SOD, CAT and GPX activities by 59% ($p<0.001$), 52% ($p<0.005$) and 58% ($p<0.001$), respectively.

In inflammatory response studies, CPF showed a strong inhibition of TPA-induced: 1) skin edema (92%, $p<0.00I$, expressed as inhibiting the increase of skin bi-fold thickness); 2) epidermal hyperplasia (88% inhibition of epidermal cell layers, $p<0.005$; 77% inhibition of epidermal thickness increase, $p<0.005$); 3) myeloperoxidase induction (78% inhibition, $p<0.001$); 4) Interlukin lc~ protein generation (66% inhibition, $p<0.001$); and 5) omithine decarboxylase induction (85% inhibition, $p<0.001$).

In all of the above studies, the observed effects of CPF were comparable to those with polyphenolic fractions isolated from green and black tea brews.

An illustrative example of the processes of the present invention proceeds with the treatment of four 8 oz. roasted coffee bean batches in the following manner (one control batch and three process batches):

Control Batch: 8 oz of beans—Nothing done to this sample.

Batch 1: 8 oz of dark roasted coffee beans—Treated with 1.6 oz of Sodium Bicarbonate (20% of bean weight sodium bicarbonate component in aqueous solution) dissolved in 19.2 oz of bottled water ("Treated Water"). Beans were placed in a large filter and the sodium bicarbonate solution was poured over the beans and allowed to filter out. The filtrate (Treated Water and unabsorbed sodium bicarbonate) was collected in a bottle and labeled 1 ("Saved 1 Water"). Analysis showed that the Filtrate 1, The Saved 1 Water, contained just minor traces of polyphenols. The beans of Batch 1 were allowed to dry overnight, and were ground and brewed the following day using a standard household coffee maker with regular tap water. Batch 1 produced a brewed coffee with a 17% increase of chlorogenic acid and a 34% increase in total polyphenols when compared with the Control Batch.

Batch 1: 8 oz of dark roasted coffee beans—Treated with 1.2 oz of Sodium Bicarbonate (15% of bean weight sodium bicarbonate component in aqueous solution) dissolved in 14.4 oz of bottled water ("Treated Water"). Beans were placed in a large filter and the sodium bicarbonate solution was poured over the beans and allowed to filter out. The filtrate (Treated Water and unabsorbed sodium bicarbonate) was collected in a bottle and labeled 2 ("Saved 2 Water"). Analysis showed that the Filtrate 1, The Saved 2 Water, contained just minor traces of polyphenols. The beans of Batch 2 were allowed to dry overnight, and were ground and brewed the following day using a standard household coffee maker with regular tap water. Batch 2 produced a brewed coffee with a 14% increase of chlorogenic acid and a 27% increase in total polyphenols when compared with the Control Batch.

Batch 3: 8 oz of dark roasted coffee beans—Treated with 0.8 oz of Sodium Bicarbonate (10% of bean weight sodium bicarbonate component in aqueous solution) dissolved in 9.6 oz of bottled water ("Treated Water"). Beans were placed in a large filter and the sodium bicarbonate solution was poured over the beans and allowed to filter out. The filtrate (Treated Water and unabsorbed sodium bicarbonate) was collected in a bottle and labeled 3 ("Saved 3 Water"). Analysis showed that the Filtrate 3, The Saved 3 Water, contained just minor traces of polyphenols. The beans of Batch 3 were allowed to dry overnight, and were ground and brewed the following day using a standard household coffee maker with regular tap water. Batch 3 produced a brewed coffee with a 11% increase of chlorogenic acid and a 22% increase in total polyphenols when compared with the Control Batch.

In view of the above, it is apparent that the methodologies developed by the present inventors provide a means by which millions of coffee drinkers and consumers of similar beverages can positively impact their state of health and reduce their propensity for disease, without any conscious divergence from the manner and experience of their present beverage consumption habits. Furthermore, private coffee drinkers and commercial purveyors of brewed coffee alike can benefit from the freshness-extending effects which are realized through practicing the present invention.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A method for enhancing proportions of polyphenolic acids in brewed beverages, the substrates for which contain polyphenolic acids, comprising the steps of:
    selecting a measure of coffee bean beverage substrate known to contain polyphenolic acids;
    preparing an aqueous sodium bicarbonate solution containing between approximately 10% and 20% sodium bicarbonate by weight compared with said weight of said coffee beach beverage substrate;
    roasting said beverage substrate; and
    rinsing said substrate with said solution while said substrate is at an elevated temperature from said roasting.

* * * * *